United States Patent [19]

Proud et al.

[11] Patent Number: 5,003,233

[45] Date of Patent: Mar. 26, 1991

[54] RADIO FREQUENCY POWERED LARGE SCALE DISPLAY

[75] Inventors: Joseph M. Proud, Wellesley Hills; Walter P. Lapatovich, Hudson, both of Mass.

[73] Assignee: GTE Laboratories Incorporated, Waltham, Mass.

[21] Appl. No.: 292,786

[22] Filed: Jan. 3, 1989

[51] Int. Cl.[5] ........................ H05B 41/38; H04N 5/66

[52] U.S. Cl. .................................... 315/324; 315/248; 315/313; 315/319; 40/541; 40/550; 340/766; 340/772

[58] Field of Search ............... 315/324, 248, 344, 313, 315/319; 40/550, 541, 545; 340/772, 766

[56] References Cited

U.S. PATENT DOCUMENTS

| | | | |
|---|---|---|---|
| 3,906,412 | 9/1975 | Meyerhoff | 333/227 |
| 4,266,167 | 5/1981 | Proud et al. | 315/248 |
| 4,350,935 | 9/1982 | Spira et al. | 315/324 x |
| 4,367,464 | 1/1983 | Kurahashi et al. | 315/324 X |
| 4,368,485 | 1/1983 | Midland | 340/766 X |
| 4,427,921 | 1/1984 | Proud et al. | 315/248 |
| 4,492,898 | 1/1985 | Lapatovich et al. | 315/248 |
| 4,559,480 | 12/1985 | Nobs | 315/324 |
| 4,625,152 | 11/1986 | Nakai | 315/324 X |
| 4,833,542 | 5/1989 | Hara et al. | 340/766 X |

*Primary Examiner*—Eugene R. LaRoche
*Assistant Examiner*—Do Hyun Yoo
*Attorney, Agent, or Firm*—J. Stephen Yeo

[57] ABSTRACT

A large scale video display has a plurality of colored electrodeless lamps which are excited by RF energy coupled from a RF cavity upon which the lamps are mounted. The lamps are easily replaced and do not degrade as fast as conventional lamps which have electrodes.

18 Claims, 4 Drawing Sheets

RADIO FREQUENCY POWERED LARGE SCALE DISPLAY

BACKGROUND OF THE INVENTION

This invention pertains to large scale video displays of information, data, images and the like, and more particularly is concerned with displays having lamps arranged as pixels. Applications for such arrays include display boards for advertising and instant replay information in sports stadiums One type of such array includes the use of large numbers of fluorescent lamps which are arranged in groups of three or more to form pixels. Each pixel contains a light source for each of the primary colors, blue, red, and green. The selective excitation of each pixel in an array of many thousand pixels can provide images similar to television images to observers located at some distance. The relative excitation of the primary color sources within each pixel determines the color which the observer perceives as emanating from that pixel, and, in the aggregate, the color information necessary to perceive entire images in color. Each lamp is coated with a primary color phosphor to emit blue, red, or green light.

In the prior art, each lamp contains at least one cathode chosen from the conventional art of fluorescent lamp making. The cathode is suitably impregnated with low work function material, and is a copious source of emitted electrons when raised to some elevated temperature. The lamps also contain a noble gas, e.g., argon, at low pressure (typically, a few torr) and a small quantity of mercury. Electrons are emitted by the cathode and are accelerated by a voltage applied between the cathode and an anode. Some of the electrons undergo collisions which result in the excitation of mercury atoms, which then emit ultraviolet light at 254 nm. This radiation is converted by the phosphor to produce 88-3-425-2-PATENT colored light. The anode serves as a collector of the charge flowing in the fluorescent tube and is the electrode which supplies voltage which controls the quantity of electron current, the intensity of the 254 nm emission, and therefore, the brightness of the light emitted by the individual pixel element.

One difficulty in using small fluorescent lamps relates to the deleterious effect of the cathode emissive material, which is gradually evaporated at the required elevated temperature and is subsequently deposited on the walls of the phosphor coated lamp. This is one of several mechanisms which gradually diminish the light output of the lamp and is one which is particularly troublesome in lamps of very small dimension. In the large scale display application this gradual dimming is troublesome because of the degradation of image quality, particularly where it may occur on time scales of a few hundred hours. Any imbalance in the aging process can produce uneven image brightness or color and lamp replacements may stand out as exceedingly bright pixels.

Another potential problem area in conventional fluorescent lamp technology is the glass to metal seals employed. While this a well established technology and can be accomplished with a great deal of reliability, the use of as many as one hundred thousand lamps in a single display places unusually rigid demands on reliability of these seals as well as the electrode structures which they support.

It is clear that there is a need for a display which uses lamps having improved reliability and which are extremely slow to deteriorate.

The individual lamps now commonly used are typically operated at power levels near 1 watt. Accordingly, each lamp must be individually supplied with power of this amount totalling as much as 10 to 100 kW for a typical large display. Depending on the requirements of the individual lamps for cathode heating or pre-heating, additional wiring may be required. Power circuitry is costly and complex making construction and repair difficult. A need, therefore, also exists for reduction in the cost and complexity of the wiring and socketing of the light emitting pixel lamp.

A principal object of the invention is to provide a large scale display which has high reliability and long operating life.

A further object of the invention is to provide a large scale display which is energy efficient and which may be constructed at low cost.

SUMMARY OF THE INVENTION

Briefly, according to one aspect of the invention, there is provided a large scale video display. Electrodeless lamps are arranged into pixels. The lamps are energized by RF power coupled from an RF cavity.

DESCRIPTION OF THE INVENTION

Figure 1:
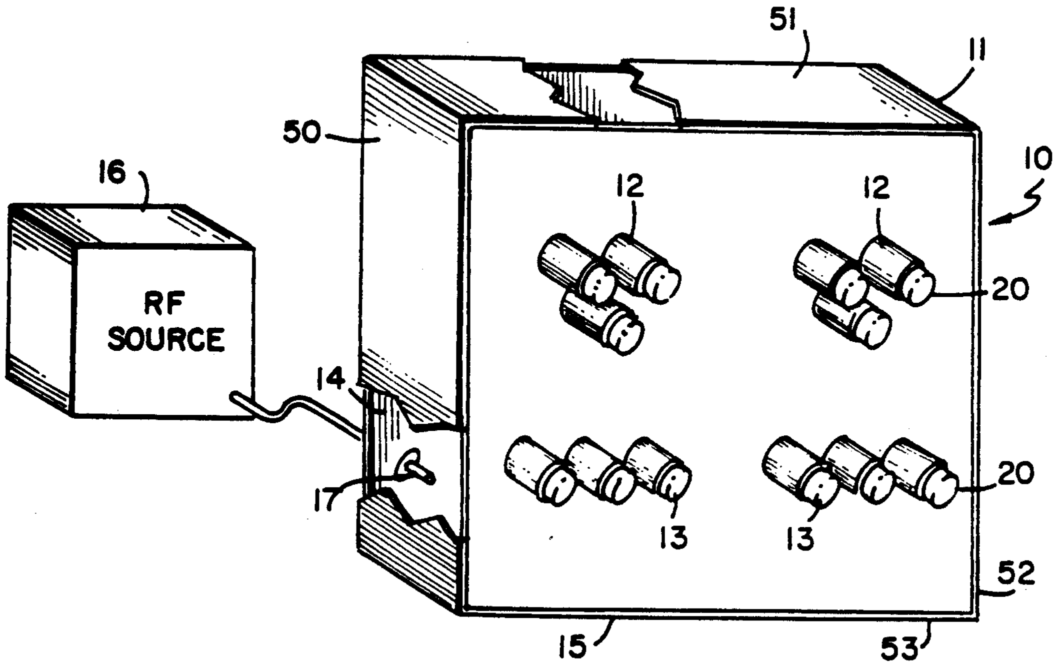
FIG. 1 shows a portion of a embodying the invention in which lamps are coupled to a RF cavity.

FIG. 1 illustrates a radio frequency powered display 10 representing a preferred embodiment of the invention. Display 10 includes a radio frequency (RF) cavity 11 coupled to a plurality of cylindrical electrodeless lamps 20 arranged in groups of three or more to form pixels 12.

In the example shown, three lamps of each pixel provides light sources at each of the primary colors: red (R), blue (B), and green (G). In practice, the large scale display will contain many pixels (e.g., ten thousand) which may be grouped into modules. FIG. 1, therefore depicts only a vary small portion of a large array.

Pixel size may be minimized by arranging the lamps in a staggered formation, forming a triangular pixel 12. Alternatively, the lamps of a pixel are arranged to form a rectangular pixel 13, which may be a square if four lamps are used.

Radio frequency cavity 11 has a back wall 14 of radio frequency-reflecting material and a similar front wall 15, spaced by side walls 50, 51, 52, 53. The lamps 20 are disposed on the front wall 15. Front wall 15 and rear wall 14 are parallel and separated by an uncritical distance which affects the quality factor or "Q" of the cavity.

A RF source 16 provides power which is coupled into the cavity through coupling element 17. (Two sections of the side walls are removed in the drawing to show the internal construction.) Coupling of RF power into cavity 11 from the RF power source may be accomplished via either a capacitive probe, as shown, or an inductive loop depending upon the modes to be excited. A suitable radio frequency is 915 Mhz.

The reflecting walls 14, 15 and side walls are made of metal or metalized surfaces and may be part of the structural elements required in large scale arrays. The cavity is shown as rectangular with plane walls suitable for a large, flat display system. Other geometries are possible, provided that dimensions of the cavity are chosen to sustain the desired modes and frequency as fully explained in certain references such as J. D. Jackson, *Classical Electrodynamics*, 2nd Ed., John Wiley & Sons, Inc., New York (1975), and E. C. Jordan, Editor, *Reference Data for Engineers: Radio, Electronics, Computer and Communications*, 7th Ed., Howard W. Sams & Co., Inc. Indianapolis (1985). In the described embodiment, the E-vectors of electrical oscillations within the cavity are aligned generally from front to back. Power coupling elements associated with each lamp sense the local E-field. Near the edges and corners of the cavity, coupling probes may be modified to couple to the local magnetic field.

Figure 2:
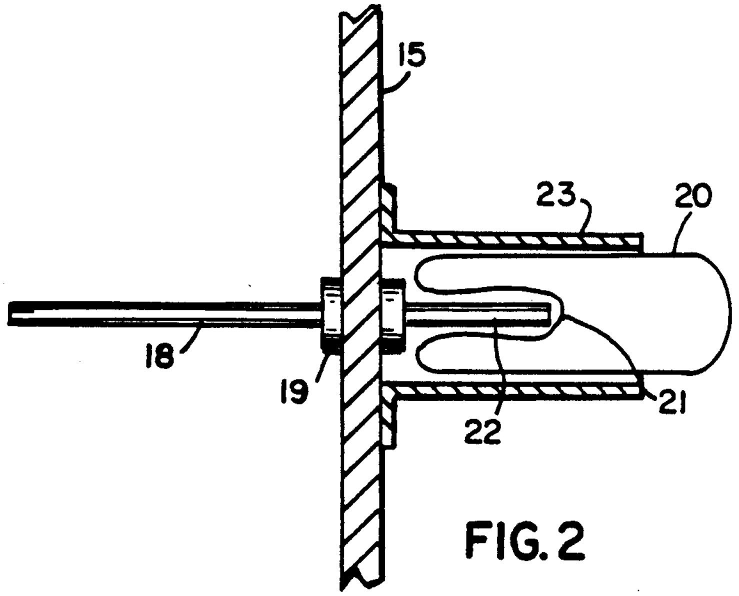
FIG. 2 is a cross sectional representation of a reentrant lamp capacitively coupled to an RF cavity.

RF power for exciting discharges in each pixel lamp 20 is coupled to each lamp from resonant cavity 11. The axis of each cylindrical electrodeless lamp 20 is arranged orthogonal on the front wall 15 and RF coupled to cavity 11 by a corresponding coupling element, which is seen in FIG. 2 as a conducting probe 18 extending through an insulator 19 into the cavity. In FIG. 2 only one lamp 20 is shown, but it should be understood that at least three such lamps are used for each pixel, and a large number of pixels are used in the display. The degree of coupling of power from the cavity is, in part, determined by the length of said probes which functions as monopole antennas.

Each electrodeless lamp 20 may follow the design principles taught in U.S. Pat. No. 4,266,167 issued May 5, 1981 to Proud and Baird. The lamp is cylindrical, with an envelope, typically glass, containing a fill material composed of a noble gas at low pressure and mercury. Excitation of the fill by a discharge therewithin produces ultraviolet light which excites an internal phosphor coating to emit visible light at spectral regions which are governed by the composition of the phosphor.

Each lamp contains a re-entrant cavity 21 which receives an inner probe 22 extending from the corresponding coupling probe 18 which serves to introduce radio frequency power. An oscillatory electric field therefore exists between probe 22 and a cylindrical outer electrode 23 arranged orthogonal to the front wall causing a plasma discharge to form within the electrodeless region of the lamp envelope. The electrical impedance presented by the lamp can be represented by the series capacitative impedance of the lamp wall and the impedance of the plasma discharge. Microwave power (e.g., frequency above about 500 MHZ) produces discharges which have impedance close in value to the driving impedance and can therefore present conditions for efficient transfer of power to the discharge.

The coupling elements for the lamps are disposed orthogonal to the front wall to transmit RF energy through the front wall of the cavity via insulated feed-throughs. The RF energy is thereby conducted along probe 22 which is internal to the re-entrant cavity 21 of the lamp 20 to produce a discharge. Such discharges can be maintained with input power levels ranging from much less than to much greater than 1 Watt.

For large scale displays, light emitted from the light sources should be substantially directional with most of the light emitted in the forward direction. As a feature of the instant invention, the outer electrode 23 is a metal cylinder which blocks light output except for the forward direction. The internal surface of the cylinder is preferably highly reflective of light in the visible spectrum to assist in channeling the radiation through the forward end of the pixel lamp.

Figure 3:
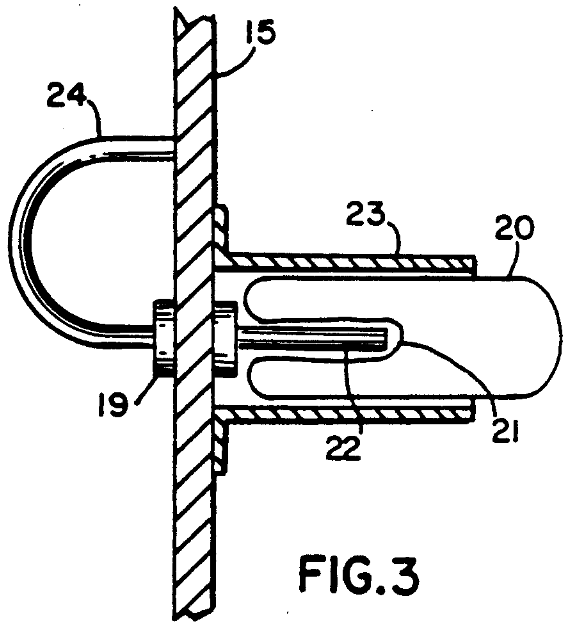
FIG. 3 is a cross sectional of a reentrant lamp inductively coupled to an RF cavity.

Instead of a straight probe, a coupling loop 24 may be used to inductively couple power from the cavity, as seen in FIG. 3. In this case, the output coupling strength is determined by the cross-sectional area of the loop 24 and by its orientation relative to the strong magnetic field components of the cavity resonant modes.

Figure 4:
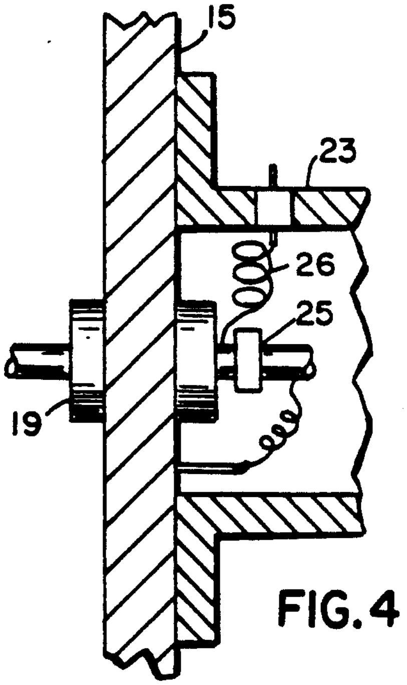
FIG. 4 illustrates a series connected switch for controlling RF power to a lamp.
Figure 5:
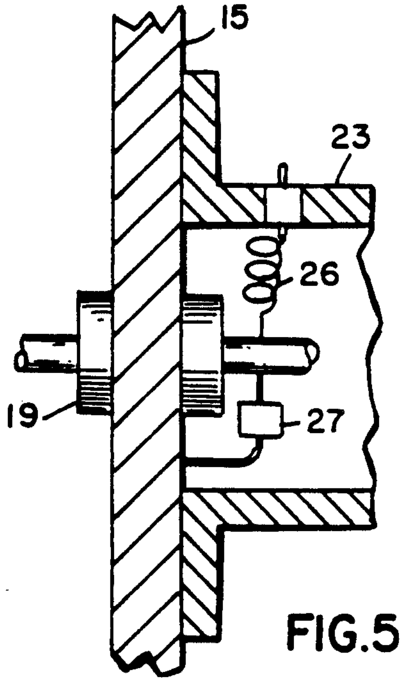
FIG. 5 illustrates a shunt connected switch for controlling RF power to a lamp.

As an additional feature, a switch is included to control the radio frequency power from each coupling element to the corresponding lamp. As an additional feature, a switch may be arranged to provide either continuous control of the power flowing separately to the corresponding lamp or to provide simple "on" or "off" states for the lamp. A simple series switch 25 is depicted in FIG. 4. The switch may be a variable impedance diode such as a varactor or PIN controlled by voltage applied through RF blocking circuit 26. The high impedance state of the series switch 25 prevents radio frequency power flow from propagating from the coupling element to the corresponding pixel lamp. Alternatively, as shown in FIG. 5, a shunt switch 27 may be arranged to perform a shunt switching function in which the switch serves to provide an effective low impedance short circuit to the front wall of resonant cavity. When shunt switch 27 is closed, the radio frequency power is largely reflected by the coupling element and little or no power is passed to the pixel lamp 20.

Figure 6:
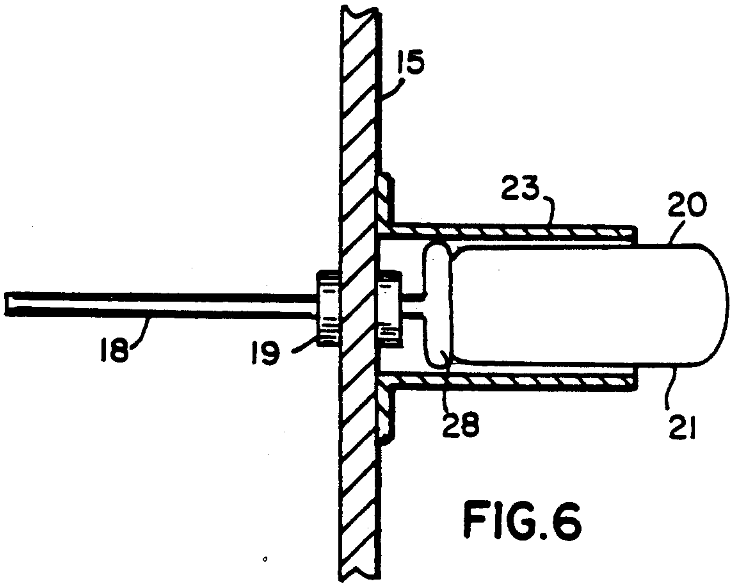
FIGS. 6 and 7 are cross sectional views to alternative arrangements to couple RF energy to non reentrant lamps using cup or disk shaped coils.
Figure 7:
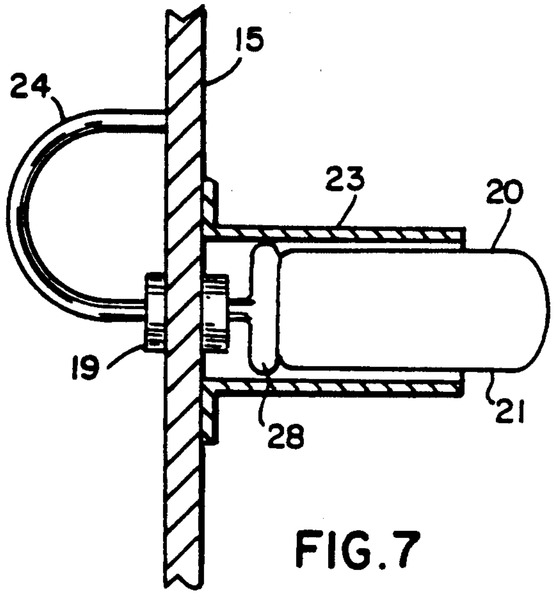

The reentrant probe 22 in the embodiment pictured in FIGS. 2 and 3 provides high fields between the inner probe 22 and the counter electrode 23 which is useful in starting of the discharge. In the embodiment pictured in FIGS. 6 and 7, a much simpler lamp construction is made possible by a circular electrode 28, which may be a cupped shaped coil or disk shaped coil, surrounding the outer portion of one end lamp 20. This arrangement eliminates the need of a re-entrant portion of the lamp. A novel advantage and feature of the instant invention is that power is distributed by a resonant cavity to the lamps in a wireless fashion from a single source. Coupling probes extract energy from the local electric or magnetic fields sustained within the resonant cavity. Because a single power source is used, RF power can be generated at low cost (e.g., 700 W at 2.45 GHz can be produced by an inexpensive tube) with less heat dissipation and reduced cooling requirements.

The preferred embodiment and best mode of practicing the invention has been disclosed. The various features may be combined in different combinations. Further modifications will now be apparent to those skilled in the art. Accordingly, the scope of the invention is to be determined by the claims.

What is claimed is:

1. A video display comprising:

a RF cavity defined by a RF reflective back wall and a RF reflective front wall, said front wall spaced from said back wall by RF reflective side walls;

a plurality of electrodeless lamps arranged in proximity to said front wall, external to said RF cavity;

RF means for providing RF energy in said RF cavity; and coupling means corresponding to each lamp for coupling RF energy from said RF cavity to the corresponding lamp.

2. The display of claim 1 wherein each lamp has a cylindrical configuration and has an axis arranged orthogonal to said front wall.

3. The display of claim 2 which includes a cylindrical sheath corresponding to each lamp, each cylindrical sheath extending orthogonal to said front wall and in electrical connection to said front wall, and covering at least part of the cylindrical side of the corresponding lamp.

4. The display of claim 3 wherein the inner surface of said sheath is reflective.

5. The display of claim 3 wherein each lamp has a reentrant cavity and the corresponding coupling means includes a conductive member arranged to fit inside said reentrant cavity.

6. The display of claim 5 wherein each of said coupling means includes a probe arranged inside said RF cavity.

7. The display of claim 6 wherein each of said coupling means includes a loop arranged inside said RF cavity.

8. The display of claim 3 wherein each lamp has a first end in proximity to said front wall, and the corresponding coupling means includes a circular member arranged about said end.

9. The display of claim 8 wherein each of said coupling means includes a probe arranged inside said RF cavity.

10. The display of claim 9 wherein each of said coupling means includes a loop arranged inside said RF cavity.

11. The display of claim 1 wherein said lamps are arranged in groups of three in a triangular pattern.

12. The display of claim 1 wherein said lamps are arranged in a rectangular pattern.

13. The display of claim 1 which includes a variable impedance device arranged in shunt between a corresponding coupling means and the front wall.

14. The display of claim 13 wherein said variable impedance device is a PIN diode.

15. The display of claim 13 wherein said variable impedance device is a varactor.

16. The display of claim 1 which includes a variable impedance device arranged in series with a lamp and the corresponding coupling means.

17. The display of claim 16 wherein said variable impedance device is a PIN diode.

18. The display of claim 16 wherein said variable impedance device is a varactor.

* * * * *